United States Patent
van de Loecht et al.

(10) Patent No.: US 8,733,541 B2
(45) Date of Patent: May 27, 2014

(54) REVOLVING TRANSPORT DEVICE HAVING AN IMPROVED DRIVE CONCEPT

(75) Inventors: Heinrich van de Loecht, Muggensturm (DE); Martin Reinisch, Esslingen (DE); Karsten Voelz, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 270 days.

(21) Appl. No.: 13/265,897

(22) PCT Filed: Mar. 23, 2010

(86) PCT No.: PCT/EP2010/053746
§ 371 (c)(1),
(2), (4) Date: Jan. 6, 2012

(87) PCT Pub. No.: WO2010/121875
PCT Pub. Date: Oct. 28, 2010

(65) Prior Publication Data
US 2012/0090963 A1    Apr. 19, 2012

(30) Foreign Application Priority Data
Apr. 23, 2009 (DE) .................. 10 2009 002 606

(51) Int. Cl.
*B65G 15/60* (2006.01)
(52) U.S. Cl.
USPC ........................................ 198/805
(58) Field of Classification Search
USPC ........................................ 198/805
See application file for complete search history.

(56) References Cited

U.S. PATENT DOCUMENTS

| | | | |
|---|---|---|---|
| 4,825,111 A | 4/1989 | Hommes et al. | |
| 5,180,048 A | 1/1993 | Kawada et al. | |
| 6,107,703 A * | 8/2000 | Korenaga | 310/12.06 |
| 6,568,332 B1 * | 5/2003 | Holzinger et al. | 104/281 |
| 6,876,107 B2 * | 4/2005 | Jacobs | 310/12.19 |
| 7,026,732 B1 * | 4/2006 | Backman et al. | 310/12.04 |
| 8,384,251 B2 * | 2/2013 | Shikayama et al. | 310/12.15 |
| 8,485,350 B2 * | 7/2013 | Reinisch et al. | 198/805 |
| 2007/0013328 A1 | 1/2007 | Shemm | |
| 2012/0139559 A1 * | 6/2012 | van de Loecht | 324/654 |

FOREIGN PATENT DOCUMENTS

| | | |
|---|---|---|
| CN | 1970410 | 5/2007 |
| DE | 10054376 | 6/2001 |
| DE | 202008016680 | 2/2009 |
| JP | 59230921 | 12/1984 |

OTHER PUBLICATIONS

PCT/EP2010/053746 International Search Report.

* cited by examiner

*Primary Examiner* — Gene Crawford
*Assistant Examiner* — Keith R Campbell
(74) *Attorney, Agent, or Firm* — Michael Best & Friedrich LLP

(57) ABSTRACT

The invention relates to a transport device that includes a revolving transport section having a linear region (2a) and a curve region (2b), an electromagnetic drive having a plurality of stationary coil elements (4) and a plurality of permanent magnets (5), wherein the stationary coil elements (4) are arranged on the transport section (2), and at least one mover (6), which is movably arranged on the revolving transport section (2) and can be moved by way of electromagnetic forces. A first row (51) of permanent magnets (5) and a second row (52) of permanent magnets (5) are arranged on the mover (6). The revolving transport section (2) has first coil regions (10), which are exclusively operatively connected to the first row (51) of permanent magnets (5), and second coil regions (8), which are exclusively operatively connected to the second row (52) of permanent magnets (5).

19 Claims, 2 Drawing Sheets

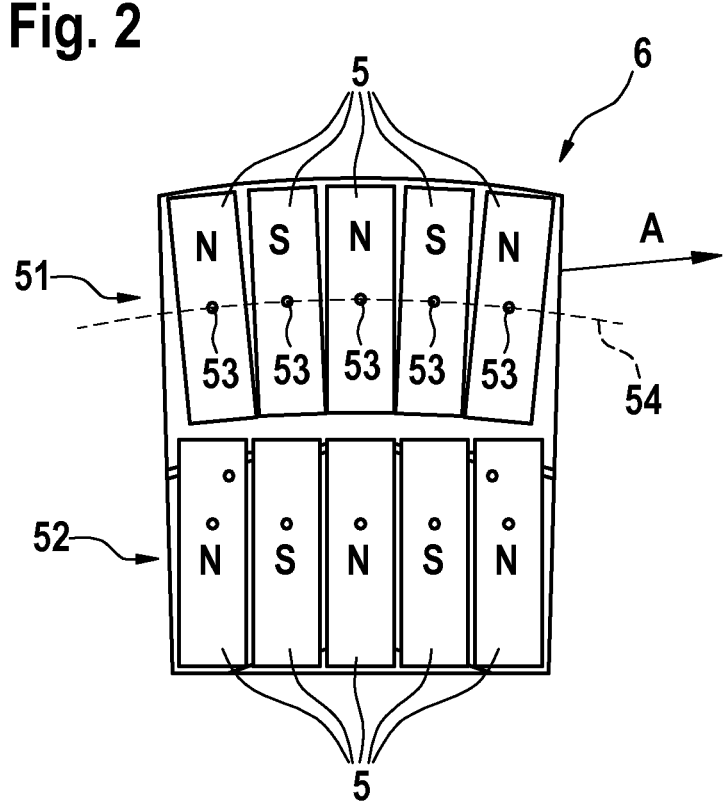

REVOLVING TRANSPORT DEVICE HAVING AN IMPROVED DRIVE CONCEPT

BACKGROUND OF THE INVENTION

The present invention relates to a revolving transport device.

Revolving transport devices are known from prior art in different configurations. The U.S. Pat. No. 6,876,107 B2 constitutes a revolving transport device, in which a plurality of coils are arranged on the transport section. The coils are thereby arranged directly adjacent to one another and are configured in a curve region of the transport section such that a direct side-by-side arrangement is ensured there. In so doing, said coils have in plan view a shape which follows the inside of the curve.

The effort is made with revolving transport devices to select a curve radius as small as possible in order to ensure a compact design. It is in fact possible with the coil arrangement proposed in the U.S. Pat. No. 6,876,107 B2 for the movers to move at a constant speed on the straight transport section, however, not in the curve region. The arrangement of the coils disclosed in this case reduces the conveying speed in the curve region so that undesirable disturbances and required large distances between the individual movers occur during operation.

SUMMARY OF THE INVENTION

The transport device according to the invention has in contrast the advantage that it includes an electromagnetic drive concept which ensures a trouble-free operation and facilitates high speeds on a linear region of the transport section as well as in a curve region of said transport section. Equal speeds in the linear region and the curve region can hereby be achieved. In addition, the invention allows for curve regions having very small radii to be implemented, i.e. particularly radii smaller than 100 mm. The invention achieves said very small radii by virtue of the fact that a first and a second row of permanent magnets are arranged on a mover, which revolves on the revolving transport section. The permanent magnets are thereby successively arranged in a running direction of the mover. Furthermore, the transport section comprises first coil elements, which are exclusively operatively connected to the first row of permanent magnets on said mover, and second coil elements, which are exclusively operatively connected to the second row of permanent magnets on said mover. As a result, it is possible for an arrangement of the coil elements and the permanent magnets operatively connected thereto, which is optimally matched to the curve region, to be implemented, particularly in the curve region. It is particularly not necessary here to make compromises like in prior art, whereby only reduced speeds of the mover are possible.

The permanent magnets of the first and second row are preferably arranged in each case so as to be aligned differently. The permanent magnets of the mover particularly have an elongated, rectangular shape. Hence, it is particularly preferred for the permanent magnets of the first row to be arranged perpendicularly to a running direction of said mover and/or for at least one permanent magnet of the second row on the mover to be arranged at an angle which is not perpendicular to the running direction, i.e. at an angle which does not equal 90°. As a result, an optimal alignment of the permanent magnets of the second row with respect to a curve region of the transport section can occur. It is in this instance particularly preferred for the permanent magnets of the second row to be arranged in such a way that the centers of gravity thereof lie on a common curved section of a circle.

In order to facilitate a particularly reliable arrangement, the coil elements are arranged on the transport section such that said elements maximally extend in each case from a lateral edge of the transport section up to a center line of said transport section. In other words, the coil elements have maximally only half of the width of said transport section.

It is additionally preferred for filler pieces to be arranged adjacently to the coil elements which only partially extend over the width of the transport section.

According to a further preferred embodiment of the invention, the coil elements on the linear region of the transport section are arranged on a side which is directed inwardly from the center line of said transport section. In addition, the coil elements on the curve region of said transport section are arranged on a side directed outwardly from said center line. As a result, larger radii can be implemented in the curve regions by the coil elements being arranged such that a greater number of said coil elements can be arranged on said curve regions. The mover can thus travel with a higher speed through said curve regions.

The coil elements are preferably arranged on the curve regions in the same geometric manner as the coil elements on the mover. That means that a radius of a curved section, in which the permanent magnets are arranged on the mover, is equal to a radius of a curved section on the transport section, on which the permanent magnets are arranged in the curve region of said transport section.

An odd number of permanent magnets per row of permanent magnets provided are especially preferably arranged on each mover of the transport device. Said permanent magnets are thereby arranged such that a north pole or a south pole is alternately provided; thus enabling a first and a last permanent magnet of each row, which are arranged in the running direction of the mover, to have the same polarity. When using a plurality of movers, mutual repulsion of successive movers is consequently achieved due to the poles being of the same polarity at the beginning and end of each mover. As a result, an unintended collision of movers can particularly be avoided.

The transport device according to the invention is particularly used in combination with packaging machines, for example, for charging packaging machines. Because the revolving transport device according to the invention is very compact and can be produced especially with radii under 100 mm, said device is particularly suited for use with small articles.

BRIEF DESCRIPTION OF THE DRAWINGS

A preferred exemplary embodiment of the invention with reference to the accompanying drawings is described below in detail. The drawings include.

DETAILED DESCRIPTION

Figure 1:
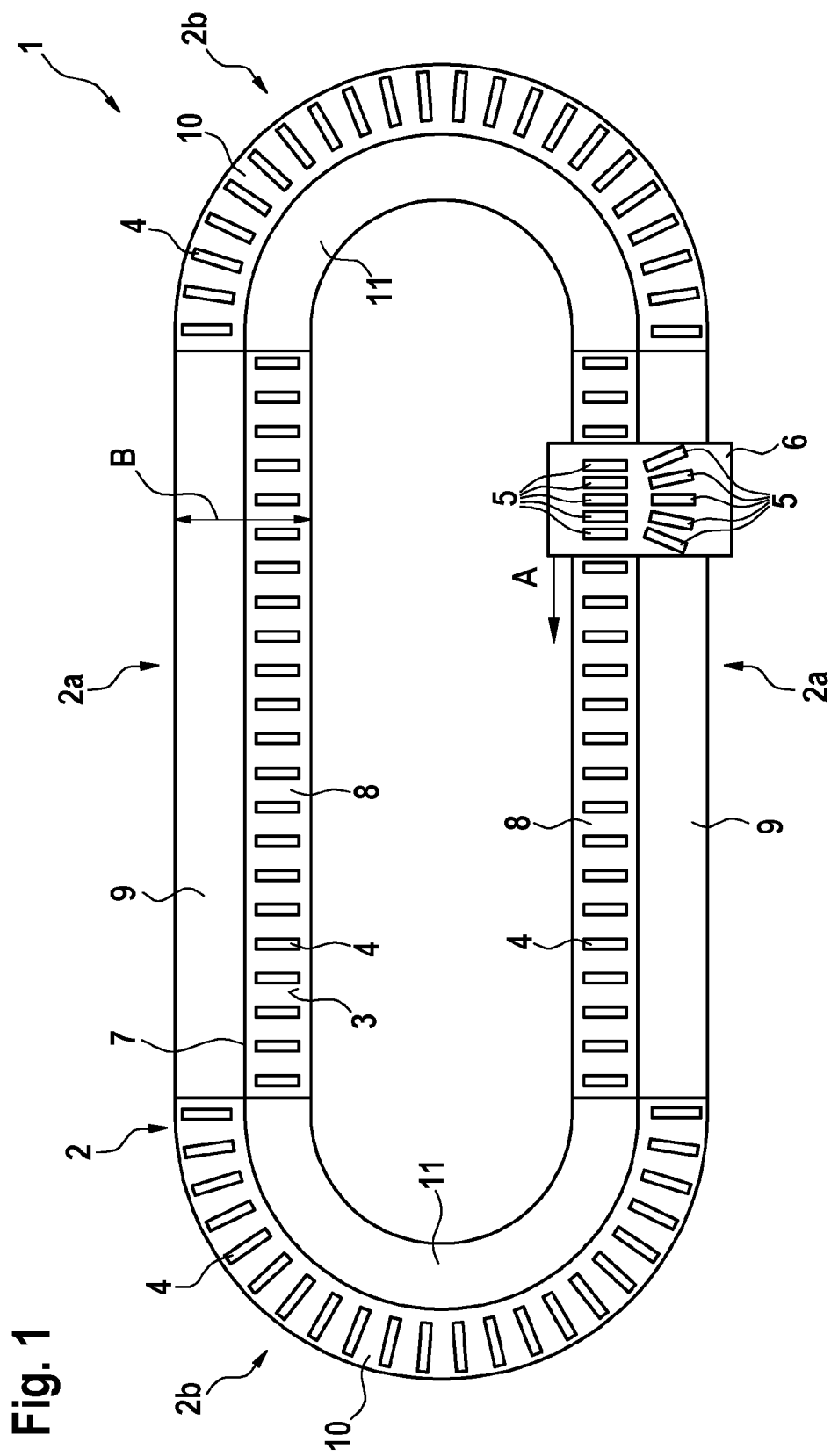
FIG. 1 a schematic plan view of a transport device according to one exemplary (a) embodiment of the invention, and FIG. 2 a schematic plan view of a mover used in FIG. 1.

A transport device 1 according to a preferred exemplary embodiment of the invention is described in detail below with reference to FIGS. 1 and 2.

As can be seen in FIG. 1, the transport device 1 comprises a revolving transport section 2 having two linear regions 2a, which in each case are connected to one another via two curve regions 2b. A plurality of movers 6 is guided on the transport section; however, for the sake of clarity, only one mover is depicted in FIG. 1. The movers can thereby directly or indirectly convey products (not depicted). An electromagnetic drive is provided between the revolving transport section 2 and the movers 6. As can be seen in FIG. 1, the electromagnetic drive comprises a plurality of coil elements 4, which are successively arranged in the running direction. A carrier surface is denoted with the reference numeral 3. Furthermore, a plurality of permanent magnets 5 is arranged on each of the movers 6. As a result, the movers 6 can be moved along the transport section 2 in the running direction A by correspondingly supplying the coil elements 4, which form a stator, with current. Said movers 6 are thereby guided by means of undepicted guiding elements on the transport section 2.

As can be directly seen in FIG. 1, the transport section 2 has different designs in the linear region 2a and in the curve region 2b. Said transport section 2 has an imaginary center line 7 which runs exactly in the middle of said transport section 2. In so doing, the center line 7 divides a width B of said transport section 2 directly in half in both the linear region 2a and the curve region 2b. In said linear region 2a, a linear coil region 8 is thus formed, which is arranged on an inwardly directed side of the center line 7. In the curve regions 2b, arch-shaped coil regions 10 are provided, which are arranged on the outwardly directed side of said center line 7 (cf. FIG. 1). On said linear region 2a, linear filler pieces 9 without an electromagnetic function are arranged on the outwardly directed side of said center line 7; and on the curve regions 2b, arch-shaped filler pieces 11 without an electromagnetic function are arranged on the inwardly directed sides of said center line 7. The coil elements 4, in both said linear region 2a and said curve region 2b, have a straight, rectangular shape. Said coil elements 4 are arranged in said linear region 2a perpendicularly to the running direction A in a row one behind the other at specified distances. In said curve regions 2b, said coil elements 4 are arranged such that they are disposed in accordance with the arc of said curve region 2b. In so doing, said coil elements 4 are arranged in each case perpendicularly to tangents at the respective position of the coil element. Said coil elements 4 thereby likewise have a straight, rectangular shape in said curve regions 2b.

The mover 6 is depicted in detail in FIG. 2. As can be seen in FIG. 2, the permanent magnets 5 are arranged on the mover 6 in a first row 51 and a second row 52. The arrangement of said permanent magnets 5 of the first row 51 thereby corresponds to the arrangement of the coil elements 4 in the curve regions 2b. In other words, said permanent magnets 5 of the first row 51 are arranged in each case with the centers of gravity 53 thereof on a curved section 54. A radius of the curved section 54 corresponds to a radius, on which the centers of gravity of the coil elements 4 lie in the curve regions 2b. Said permanent magnets 5 of the second row 54 on the mover are thereby arranged perpendicular to the running direction A and thus in the same manner as the coil elements 4 on the linear regions 2a of the transport section 2.

As a result of the single-row arrangement of the stator and coil elements on the transport section, on different widths thereof, the coil elements 4 of the linear coil regions 8 are exclusively operatively connected to the permanent magnets 5 of the second row 52 of the movers. In the same way, the arch-shaped coil regions 10 are operatively connected to the permanent magnets 5 of the first row 51 on the movers 6, said magnets being likewise arranged arcuately. A corresponding actuation of the electromagnetic drive can therefore be facilitated for the linear regions 2a and the curve regions 2b in each case in a different way. This is the case because different rows of permanent magnets are arranged for the respective regions on the mover and said rows of permanent magnets interact in each case exclusively with the corresponding coil regions. Almost ideal overlapping ratios between the coil elements and the permanent magnets of the respective row on the mover can consequently be achieved according to the invention in the linear regions 2a as well as in the curve regions 2b so that no unnecessary compromises are required when designing the transport device. The inventive solution furthermore facilitates a reduction of the size of the coil elements in said linear regions 2a as well as in said curve regions 2b. In addition, the inventive subdivision of the transport section allows the mover 6 to be guided more stably. It should also be noted that additional linear coil elements can be connected in parallel to increase the feed force in selected linear regions.

The inventive transport device described above is particularly used in combination with packaging machines, wherein the movers 6 directly or indirectly convey the articles to be packaged, for example, bags, bottles, chocolate bars etc. By "indirectly convey", a pusher or something similar being arranged on the mover is meant, said pusher having contact with the product to be conveyed. The transport section 2 can thereby be positioned either vertically or horizontally. A radius of the curve regions 2b is in this case preferably less than 100 mm, particularly approximately 90 mm.

The invention claimed is:

1. A transport device, comprising:
a revolving transport section having a linear region (2a) and a curve region (2b),
an electromagnetic drive having a plurality of stationary coil elements (4) and a plurality of permanent magnets (5), wherein the stationary coil elements (4) are arranged on the transport section (2), and
at least one mover (6), which is movably arranged on the revolving transport section (2) and can be moved by way of electromagnetic forces, wherein the permanent magnets (5) are arranged on the mover (6),
wherein a first row (51) of permanent magnets (5) and a second row (52) of permanent magnets (5) are arranged on the mover (6),
wherein the first row (51) and the second row (52) of the permanent magnets are successively arranged in a running direction (A) of the mover (6),
wherein the revolving transport section (2) has first coil regions (10), which are exclusively operatively connected to the first row (51) of permanent magnets (5) on the mover (6), and second coil regions (8), which are exclusively operatively connected to the second row (52) of permanent magnets (5) on the mover (6)
wherein the first row (51) of permanent magnets (5) of the mover is arranged so as to be differently aligned with respect to the second row (52) of permanent magnets of said mover, and
characterized in that the permanent magnets (5) of the second row (52) are arranged perpendicularly to the running direction (A) of the mover and at least one permanent magnet of the first row (51) is arranged at an angle, which does not equal 90°, to said running direction (A) of said mover.

2. The transport device according to claim 1, characterized in that the permanent magnets (5) of the first row (51) are arranged with centers of gravity (53) thereof on a curved section (54).

3. The transport device according to claim 1, characterized in that the coil regions (8, 10) are arranged only partially over an entire width (B) of the transport section (2).

4. The transport device according to claim 3, characterized in that filler pieces (9, 11) are arranged adjacently to the coil regions, which are arranged only partially over the width (B) of the transport section (2).

5. The transport device according to claim 3, characterized in that the coil regions on the entire transport section extend in each case only up to a center line (7) of said transport section (2).

6. A transport device, comprising:
a revolving transport section having a linear region (2a) and a curve region (2b),
an electromagnetic drive having a plurality of stationary coil elements (4) and a plurality of permanent magnets (5), wherein the stationary coil elements (4) are arranged on the transport section (2), and
at least one mover (6), which is movably arranged on the revolving transport section (2) and can be moved by way of electromagnetic forces, wherein the permanent magnets (5) are arranged on the mover (6),
wherein a first row (51) of permanent magnets (5) and a second row (52) of permanent magnets (5) are arranged on the mover (6),
wherein the first row (51) and the second row (52) of the permanent magnets are successively arranged in a running direction (A) of the mover (6),
wherein the revolving transport section (2) has first coil regions (10), which are exclusively operatively connected to the first row (51) of permanent magnets (5) on the mover (6), and second coil regions (8), which are exclusively operatively connected to the second row (52) of permanent magnets (5) on the mover (6),
wherein the coil regions (8, 10) are arranged only partially over an entire width (B) of the transport section (2),
wherein the coil regions on the entire transport section extend in each case only up to a center line (7) of said transport section (2), and
characterized in that the coil regions on the linear region (2a) of the transport section are arranged on a side of the center line (7) of said transport section which is inwardly directed and the coil regions on the curve region (2b) of said transport section are arranged on a side of said center line (7) which is outwardly directed.

7. A transport device, comprising:
a revolving transport section having a linear region (2a) and a curve region (2b),
an electromagnetic drive having a plurality of stationary coil elements (4) and a plurality of permanent magnets (5), wherein the stationary coil elements (4) are arranged on the transport section (2), and
at least one mover (6), which is movably arranged on the revolving transport section (2) and can be moved by way of electromagnetic forces, wherein the permanent magnets (5) are arranged on the mover (6),
wherein a first row (51) of permanent magnets (5) and a second row (52) of permanent magnets (5) are arranged on the mover (6),
wherein the first row (51) and the second row (52) of the permanent magnets are successively arranged in a running direction (A) of the mover (6),
wherein the revolving transport section (2) has first coil regions (10), which are exclusively operatively connected to the first row (51) of permanent magnets (5) on the mover (6), and second coil regions (8), which are exclusively operatively connected to the second row (52) of permanent magnets (5) on the mover (6),
characterized in that the coil elements on the curve region (2b) are arranged at a radius equal to that of the permanent magnets of the first row (51) on the mover.

8. The transport device according to claim 7, characterized in that an odd number of permanent magnets (5) is arranged on the mover (6) per row (51, 52) of permanent magnets (5), wherein a first and a last permanent magnet in the running direction (A) of said mover (6) in each row have in each case the same polarity in order to achieve a mutual repulsion of consecutive movers when a plurality of movers (6) is used.

9. The transport device according to claim 7, characterized in that the permanent magnets (5) are designed as linear permanent magnets having a rectangular form.

10. The transport device according to claim 9, characterized in that the permanent magnets (5) of the second row (52) are arranged perpendicularly to the running direction (A) of the mover and at least one permanent magnet of the first row (51) is arranged at an angle, which does not equal 90°, to said running direction (A) of said mover.

11. The transport device according to claim 10, characterized in that the permanent magnets (5) of the first row (51) are arranged with centers of gravity (53) thereof on a curved section (54).

12. The transport device according to claim 11, characterized in that the coil regions (8, 10) are arranged only partially over an entire width (B) of the transport section (2).

13. The transport device according to claim 12, characterized in that filler pieces (9, 11) are arranged adjacently to the coil regions, which are arranged only partially over the width (B) of the transport section (2).

14. The transport device according to claim 13, characterized in that the coil regions on the entire transport section extend in each case only up to a center line (7) of said transport section (2).

15. The transport device according to claim 14, characterized in that the coil regions on the linear region (2a) of the transport section are arranged on a side of the center line (7) of said transport section which is inwardly directed and the coil regions on the curve region (2b) of said transport section are arranged on a side of said center line (7) which is outwardly directed.

16. The transport device according to claim 15, characterized in that an odd number of permanent magnets (5) is arranged on the mover (6) per row (51, 52) of permanent magnets (5), wherein a first and a last permanent magnet in the running direction (A) of said mover (6) in each row have in each case the same polarity in order to achieve a mutual repulsion of consecutive movers when a plurality of movers (6) is used.

17. The transport device according to claim 1, characterized in that the permanent magnets (5) are designed as linear permanent magnets having a rectangular form.

18. The transport device according to claim 6, characterized in that the first row (51) of permanent magnets (5) of the mover is arranged so as to be differently aligned with respect to the second row (52) of permanent magnets of said mover.

19. The transport device according to claim 6, characterized in that the permanent magnets (5) are designed as linear permanent magnets having a rectangular form.

* * * * *